US006364594B1

(12) United States Patent
Kagan et al.

(10) Patent No.: US 6,364,594 B1
(45) Date of Patent: Apr. 2, 2002

(54) WHEELCHAIR TRANSFER DEVICE FOR USE IN AMUSEMENT RIDES

(75) Inventors: Joel Kagan, Orlando, FL (US); Richard T. Geiger, Whitefish Bay, WI (US); Andrew S. Robertson, Santa Monica, CA (US)

(73) Assignee: Universal City Studios, Inc., Universal City, CA (US)

( * ) Notice: Subject to any disclaimer, the term of this patent is extended or adjusted under 35 U.S.C. 154(b) by 0 days.

(21) Appl. No.: 09/611,749

(22) Filed: Jul. 7, 2000

(51) Int. Cl.[7] .......................... B60P 1/00; A61G 3/02; A61G 3/08

(52) U.S. Cl. ...................... 414/399; 414/339; 414/401; 414/921

(58) Field of Search ............................ 414/921, 399, 414/401, 339

(56) References Cited

U.S. PATENT DOCUMENTS

| | | | |
|---|---|---|---|
| 1,360,412 A | 11/1920 | Kirchner | |
| 1,477,815 A | 12/1923 | Denning | |
| 2,950,126 A | 8/1960 | Armentrout | 280/179 |
| 4,231,695 A | 11/1980 | Weston, Sr. | 410/69 |
| 4,609,313 A | 9/1986 | Oshino et al. | 410/67 |
| 4,898,508 A | 2/1990 | Hayata | 414/476 |
| 5,378,105 A | 1/1995 | Palko | 414/540 |
| 5,564,984 A | 10/1996 | Mirabella et al. | 472/43 |
| 5,713,704 A | 2/1998 | Pommier et al. | 410/9 |
| 5,819,338 A | 10/1998 | Hession | 5/86.1 |
| 5,884,563 A | 3/1999 | Sheldon et al. | 104/53 |
| 5,935,011 A | 8/1999 | Morgan et al. | 472/29 |

FOREIGN PATENT DOCUMENTS

| | | |
|---|---|---|
| DE | 29909802 | * 8/1999 |

* cited by examiner

*Primary Examiner*—Steven A. Bratlie
(74) *Attorney, Agent, or Firm*—Lyon & Lyon LLP

(57) ABSTRACT

A device and method of loading wheelchair-using passengers includes a passenger platform, a ride vehicle, a lifting device, and a moveable transfer platform. The lifting device is located under the passenger platform and has raised and lowered positions. A moveable transfer platform is affixed to the lifting device when the lifting device is in the raised position. The lifting device is then lowered in the lowered position, wherein a wheelchair-using passenger is secured to the top of the moveable transfer platform. The lifting device then raises the moveable transfer platform and passenger to a raised position. The moveable transfer device is then rolled to a nearby ride vehicle wherein the moveable transfer device and passenger are secured. After completion of the ride, the moveable transfer device is then rolled on top of the lifting device, which is then lowered beneath the platform. The wheelchair-using passenger is then able to simply exit the ride attraction via the platform.

19 Claims, 8 Drawing Sheets

WHEELCHAIR TRANSFER DEVICE FOR USE IN AMUSEMENT RIDES

BACKGROUND OF THE INVENTION

The field of the invention is theme or amusement park ride attractions. More specifically, the invention relates to wheelchair transfer devices that load and unload passengers in amusement park or theme park ride vehicles.

Theme or amusement park ride attractions have become increasingly popular. These ride attractions typically involve ride vehicles moving along a predefined path or track. Passengers enter and exit the ride vehicles in a common loading/unloading area. Generally, passengers walk across a passenger platform area and enter ride vehicles stopped adjacent to the passenger platform area. Unfortunately, passengers using wheelchairs are often unable to enjoy many of these ride attractions, due to the inaccessibility of the ride vehicle. For example, to enter the ride vehicle, passengers are typically required to step into or onto the vehicle and seat themselves. Passengers that are unable to move from a wheelchair into the seat have therefore been unable to ride.

Fortunately more and more amusement park ride attractions are becoming accessible to wheelchair-using passengers. However, these ride attractions usually require the person to exit the wheelchair. For certain individuals, one or more ride operators are needed to assist in the transfer from the wheelchair to a seat in the ride vehicle. However, some people cannot leave the wheelchair. To this end, some amusement park ride attractions are designed such that a wheelchair can be loaded onto the ride vehicle itself, thus eliminating the need for the passenger to be physically transferred from the wheelchair. This is often done with the use of foldable ramps or special lifting devices. These devices, however, can be difficult to use and take up additional space on the ride vehicle. In addition, current methods of loading the entire wheelchair with passenger onto a ride vehicle are time consuming and slow down the loading and unloading process, thus decreasing the overall passenger carrying capacity of the ride.

Accordingly, there exists a need for an amusement park ride attraction that allows a passenger using a wheelchairs to be loaded onto the ride vehicle while remaining in the wheelchair. There also exists a need for an amusement park ride attraction that allows for easy and rapid loading and unloading of wheelchair-using passengers into the ride vehicle without adding special ramps or lifting devices to the ride vehicle itself. Preferably, the wheelchair transfer device does not appreciably reduce the overall passenger throughput of the ride.

SUMMARY OF THE INVENTION

In a first aspect of the invention, a wheelchair transfer device includes a passenger platform, a ride vehicle, a lifting device, and a moveable transfer platform. The lifting device is located beneath the passenger platform. The moveable transfer platform is moveable between the ride vehicle, the passenger platform, and the lifting device.

In another aspect of the invention, a method of loading wheelchair using passengers includes the steps of lowering a moveable transfer platform to a lowered position such that a top surface of the moveable transfer platform is substantially flush with the passenger platform. The wheelchair using passenger is then secured to the moveable transfer platform. The moveable transfer platform is raised to a raised position. The moveable transfer platform is then moved to a ride vehicle where the moveable transfer platform and wheelchairusing passenger are secured.

It is an object of the invention to provide a wheelchair transfer device for use in an amusement park ride attraction that permits easy loading and unloading of passengers in wheelchairs. The transfer device preferably loads and unloads passengers in wheelchairs in a relatively rapid manner to maintain a high overall passenger throughput. The wheelchair transfer device quickly loads and unloads wheelchair-using passengers onto and off of the ride vehicle without transferring the passengers into and out of their wheelchairs.

BRIEF DESCRIPTION OF THE DRAWINGS

FIG. 6(*b*) is an elevation view of the wheelchair transfer device in the lowered position.

DETAILED DESCRIPTION OF THE PREFERRED EMBODIMENTS

Figure 1:
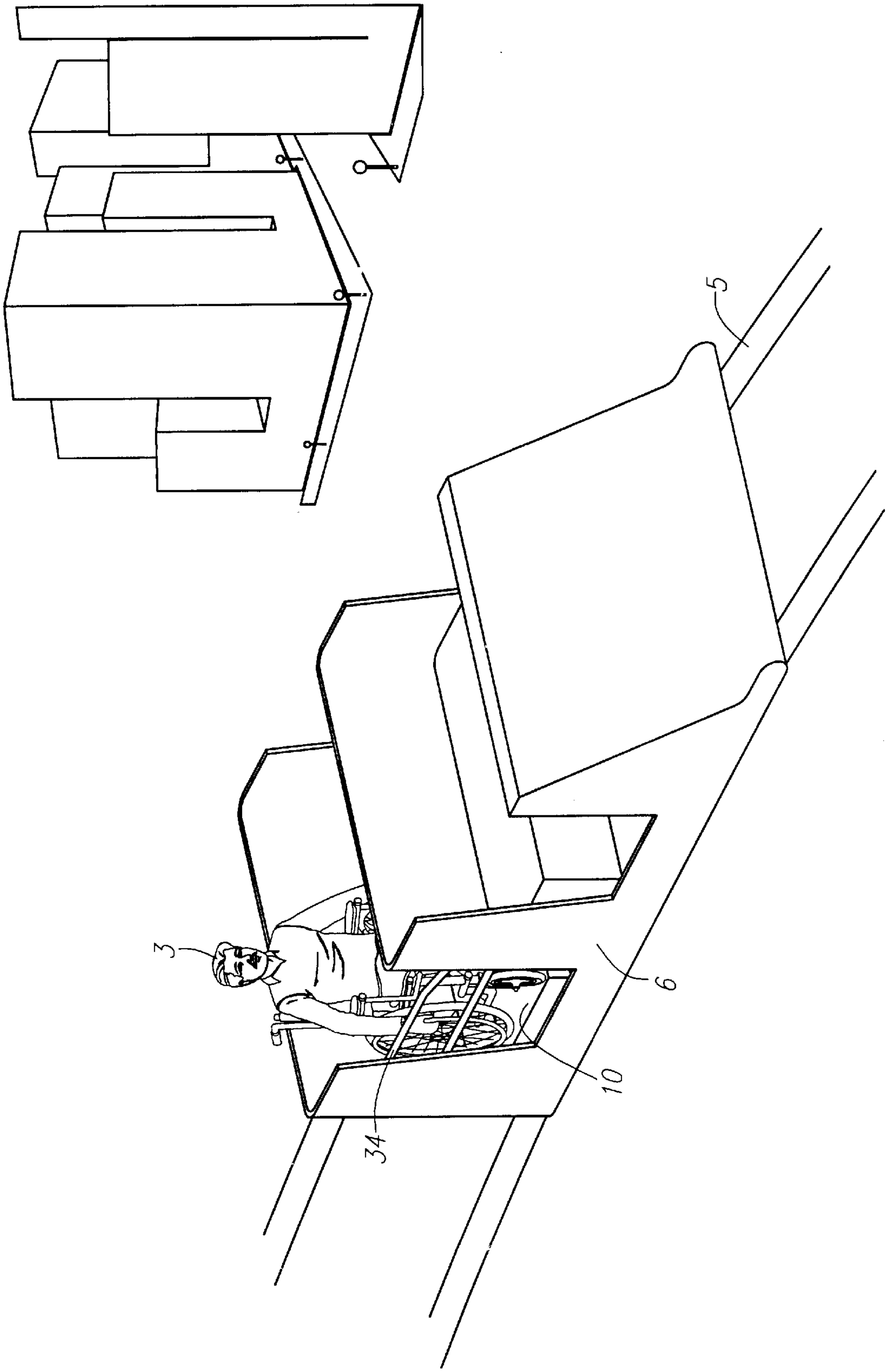
FIG. 1 is a perspective view of the amusement park ride attraction.
Figure 2:
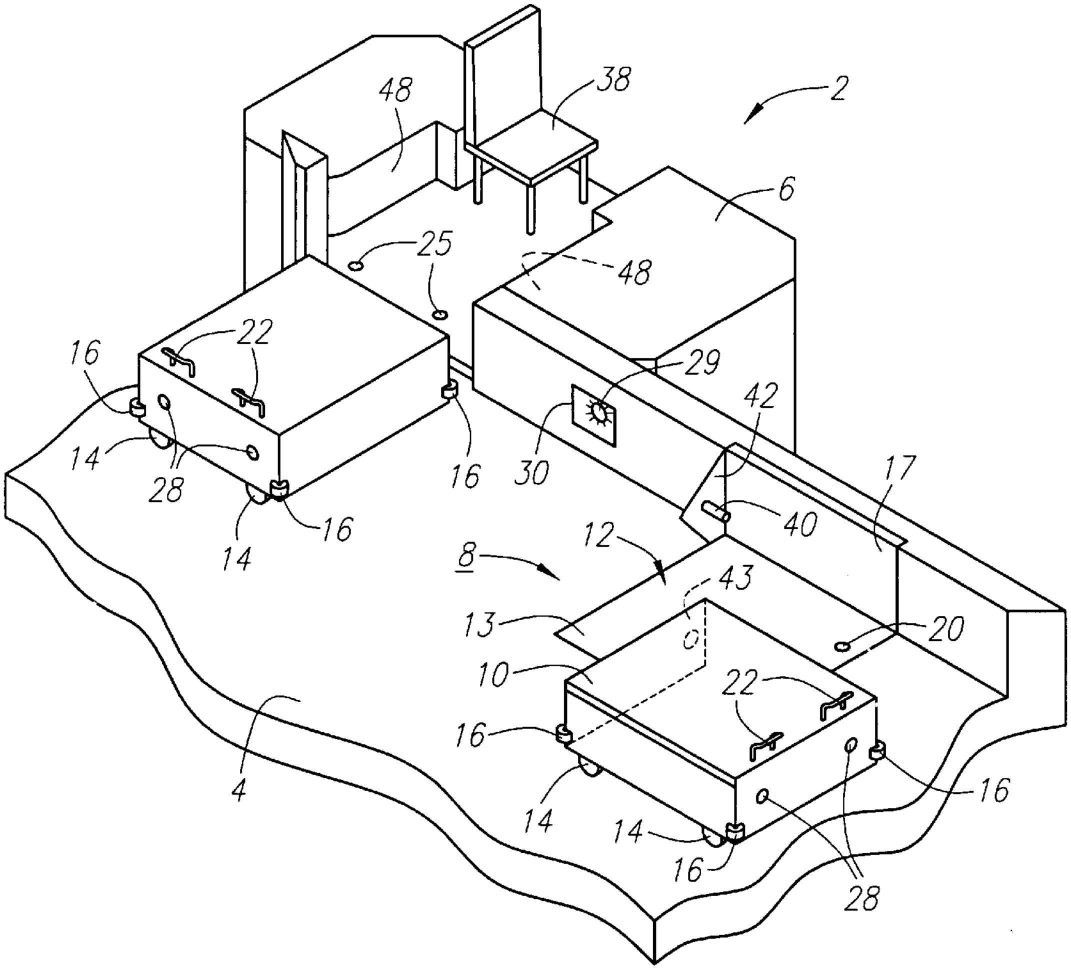
FIG. 2 is a perspective view of the wheelchair transfer device.
Figure 3:
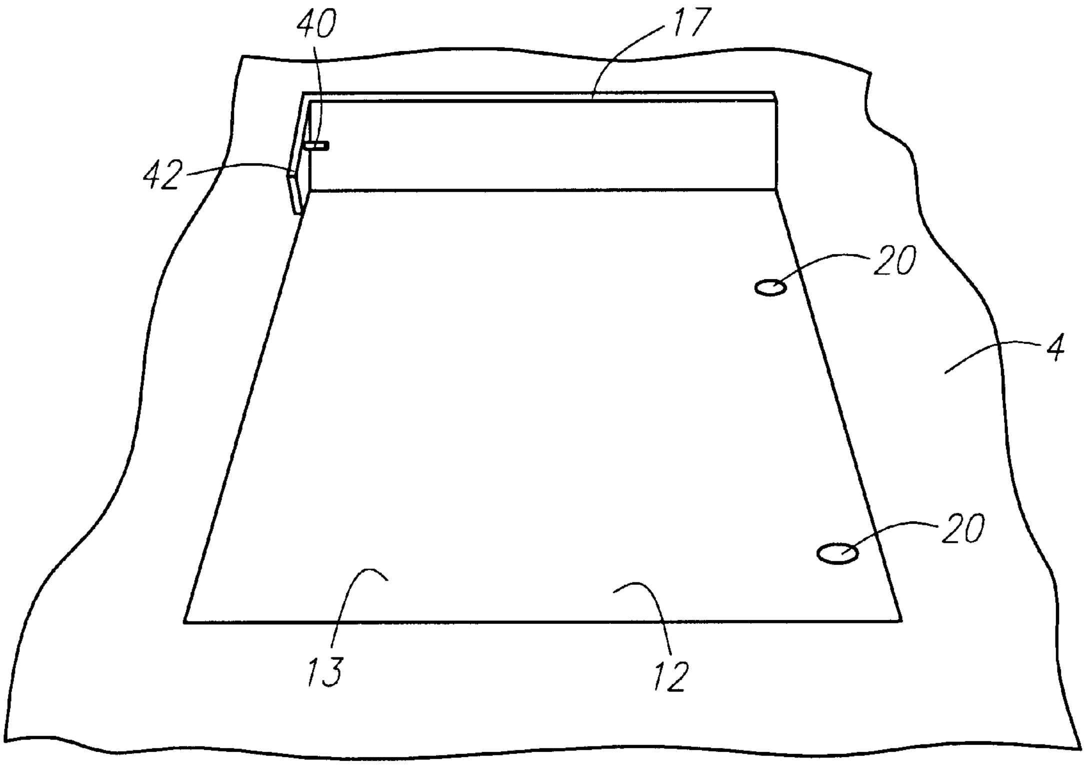
FIG. 3 is a perspective view of the lifting device in the raised position.

With reference to the drawings, and FIG. 1 specifically, an amusement ride attraction 2 includes one or more amusement ride vehicles 6 that ride on a track or path 5 through a themed environment. Referring now to FIG. 2, the amusement ride attraction includes a loading and unloading platform 4 where passengers 3 are loaded and unloaded into and out of amusement ride vehicles 6. Preferably, as seen in FIG. 2, a wheelchair transfer device 8 is located on and within the loading and unloading platform 4 and is used to load and unload wheelchair-using passengers into and out of a specially designed ride vehicle 6. The wheelchair transfer device 8 includes a transfer platform 10 that is moveable and a lifting device 12. The lifting device 12 preferably includes an upper platform surface 13. The transfer platform 10 rests on the upper platform surface 13 when the transfer platform 10 is on the lifting device 12. The lifting device 12 moves between raised and lowered positions. FIG. 3 shows the lifting device 12 in the raised position.

The transfer platform 10 preferably includes four swiveling wheels or casters 14 (two wheels 14 are shown in FIG. 2, the other two wheels 14 are obstructed from view) that allow the transfer platform 10 to be rolled across the loading and unloading platform 4 and onto the ride vehicle 6. In this regard, the transfer platform 10 is moveable between the loading/unloading platform 4, the ride vehicle 6, and the lifting device 12. Preferably, the swiveling wheels 14 are swivel casters or the like. The transfer platform 10 also preferably includes four alignment rollers 16 that align the transfer platform 10 to a wall portion 17.

Figure 4:
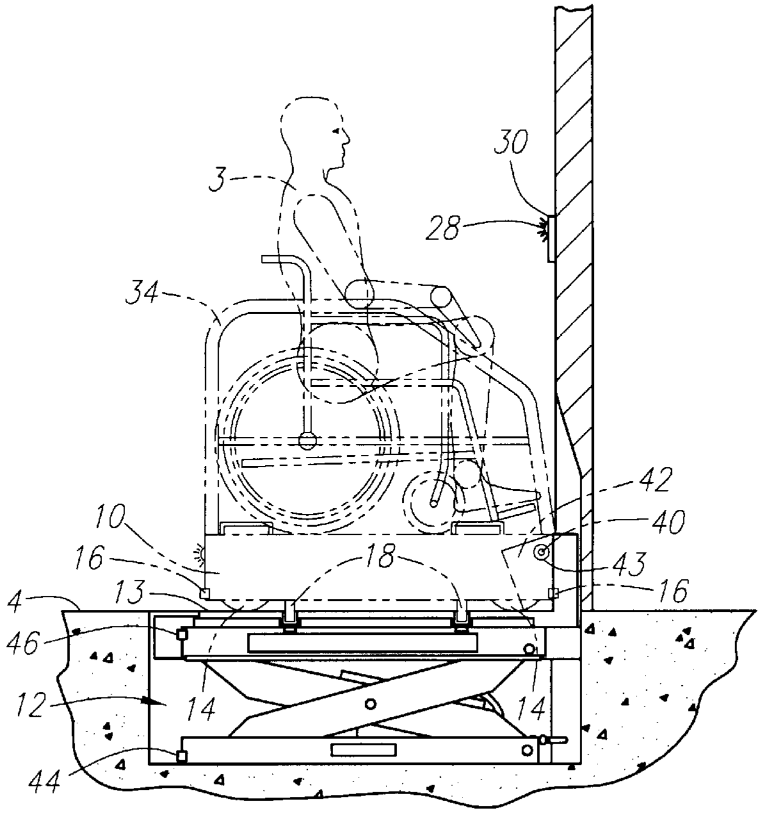
FIG. 4 is a side elevation view of the wheelchair transfer device shown in a raised position.
Figure 5:
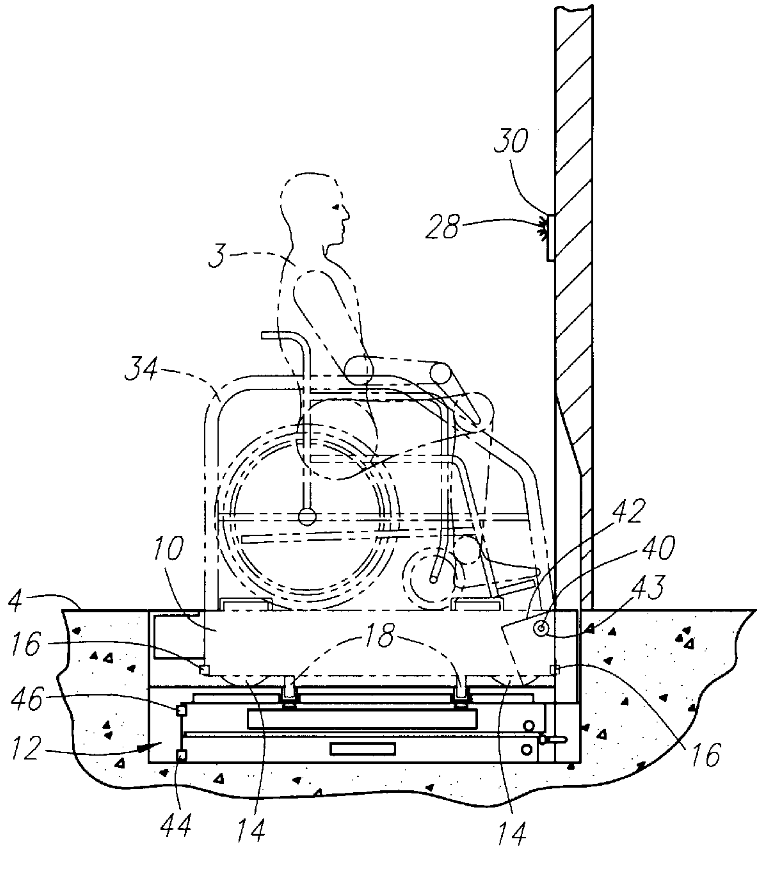
FIG. 5 is a side elevation view of the wheelchair transfer device shown in a lowered position.
Figure 6A:
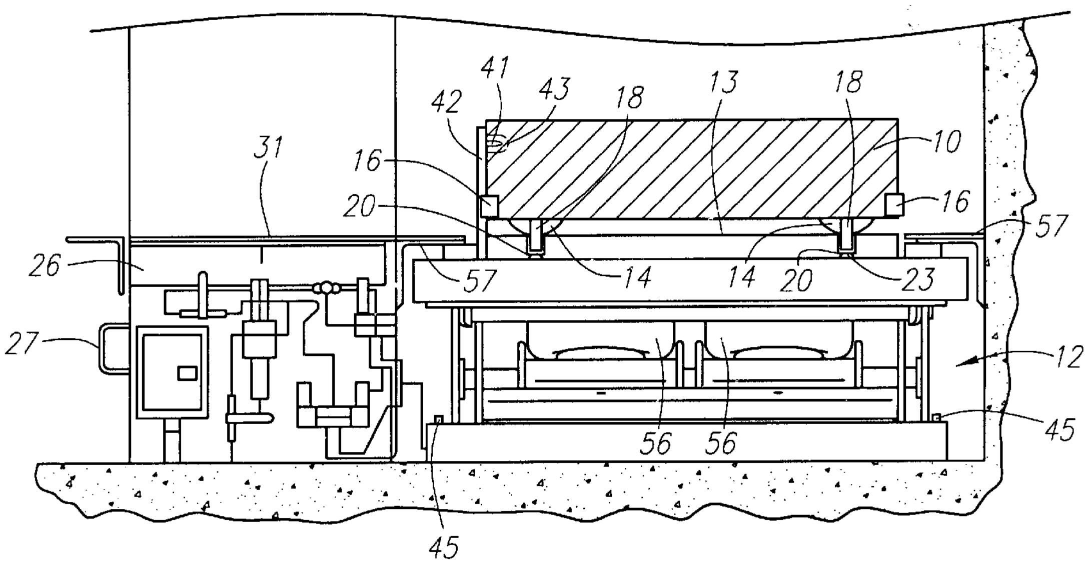
FIG. 6(*a*) is an elevation view of the wheelchair transfer device in the raised position.
Figure 6B:
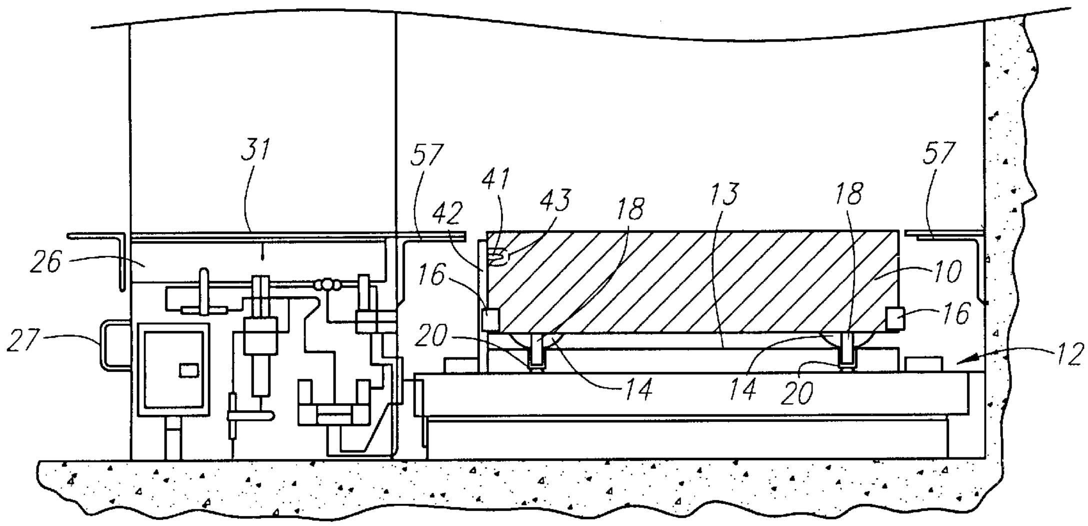

Rollers 16 also aid in aligning the transfer platform 10 to the cavity in the ride vehicle 6. As seen in FIGS. 4, 5, 6(*a*), and 6(*b*), vertically-oriented foot activated locking pins 18 are located preferably at two locations (preferably on one side) on the transfer platform 10 to secure the transfer platform 10 onto the lifting device 12 and the ride vehicle 6. With reference to FIGS. 2 and 3, two locking pin sockets 20 are located in the lifting device 12 to receive the locking pins 18 (one locking pin socket 20 is obstructed from view in FIG. 2 by the transfer platform 10). In addition, as seen in FIG. 2, two locking pin sockets 25 are located in the ride vehicle 6 to engage the two locking pins 18 of the transfer platform 10 when the transfer platform 10 is within the ride vehicle 6. The locking pins 18 are released from the locking pin sockets 20 by individual foot-actuated pedals 22 located on the transfer platform 10.

As shown in FIG. 2, a visual flag 28 is preferably located on the transfer platform 10 and is coupled to foot pedals 22 and indicates to the ride operator the status of the foot pedals 22. By way of illustration, the visual flag 28 may include a mechanically-triggered visual flag 28 having two colors, one color indicating that the foot pedals 22 are in the up position while another color indicates that the foot pedals 22 are in the down position.

One or more control panel lights 29 are preferably located on the control panel 30. The control panel lights 29 indicate to the ride operator that the locking pins 18 are engaged. This permits the lifting device 12 to be lowered or raised only when the locking pins 18 are confirmed to be engaged, ensuring that the transfer platform 10 is locked down.

As seen in FIGS. 2, 3,4, 5, 6(*a*), and 6(*b*) the lifting device 12 is located beneath the loading/unloading platform 4. A utility pit 26, as shown in FIGS. 6(*a*) and 6(*b*), is preferably located adjacent to the lifting device 12 and under the loading/unloading platform 4. The utility pit 26 includes electrical utilities, air utilities, and the like. The utility pit 26 is accessible via a removable door panel 27 and removable cover plate 31.

Figure 7:
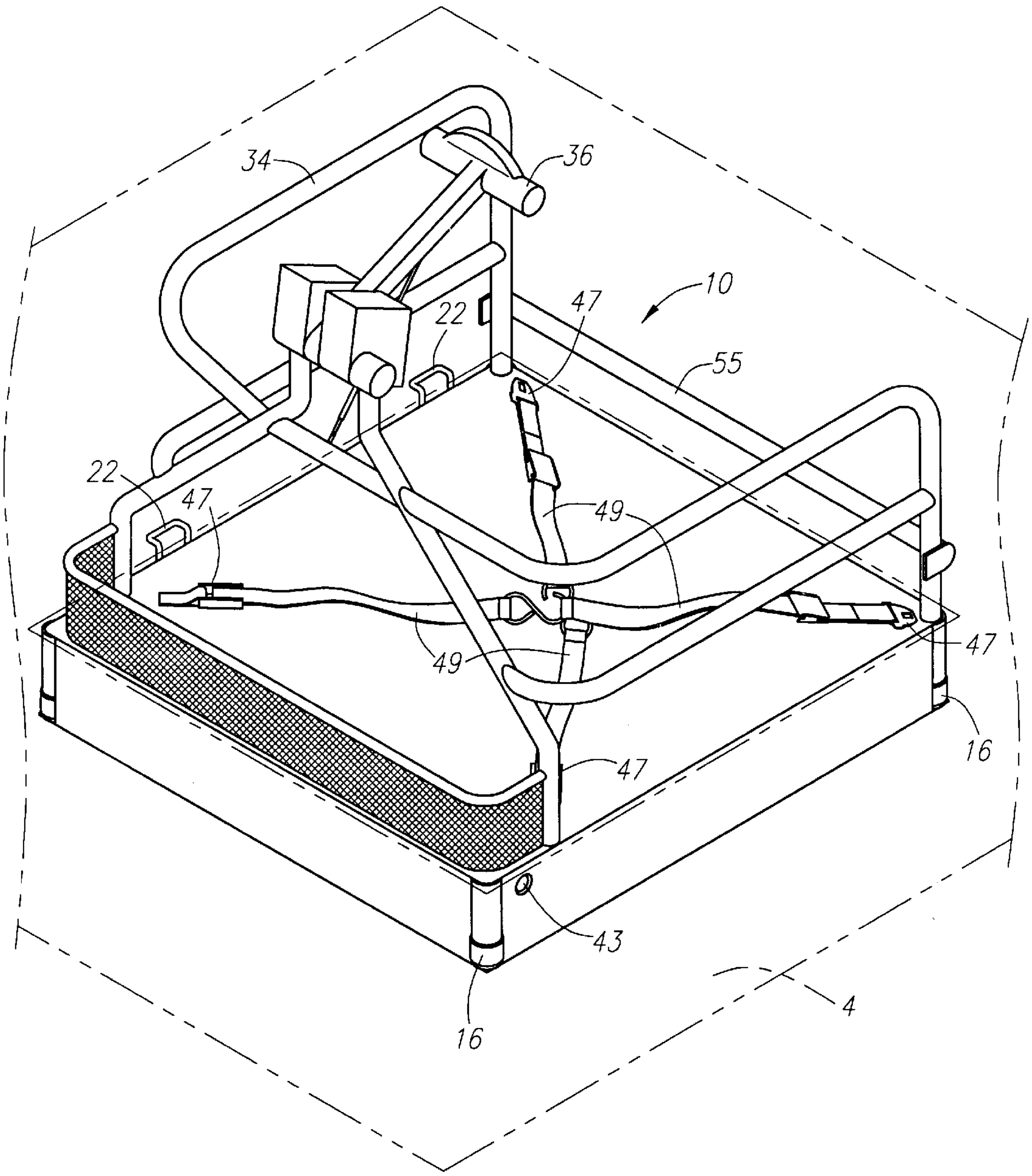
FIG. 7 is a perspective view of the transfer platform.

Referring to FIGS. 1, 4, 5, and 7 the transfer platform 10 preferably includes a grab handle 34 to assist in rolling the transfer platform 10 over to the ride vehicle 6. The transfer platform 10 may also include an optional lap bar 36, as shown in FIG. 7, to secure the wheelchair-using passenger during the ride. In the preferred embodiment, as shown in FIG. 2, the ride vehicle 6 includes a companion seat 38 (shown also in FIG. 8) located adjacent to the area intended for the transfer platform 10. This allows a companion to ride next to a wheelchair-using passenger 3. The transfer platform 10 is designed such that the wheelchair-using passenger 3 is at approximately the same height as the other passengers in the ride vehicle 6, thereby insuring an equivalent ride experience for every passenger.

Figure 9:
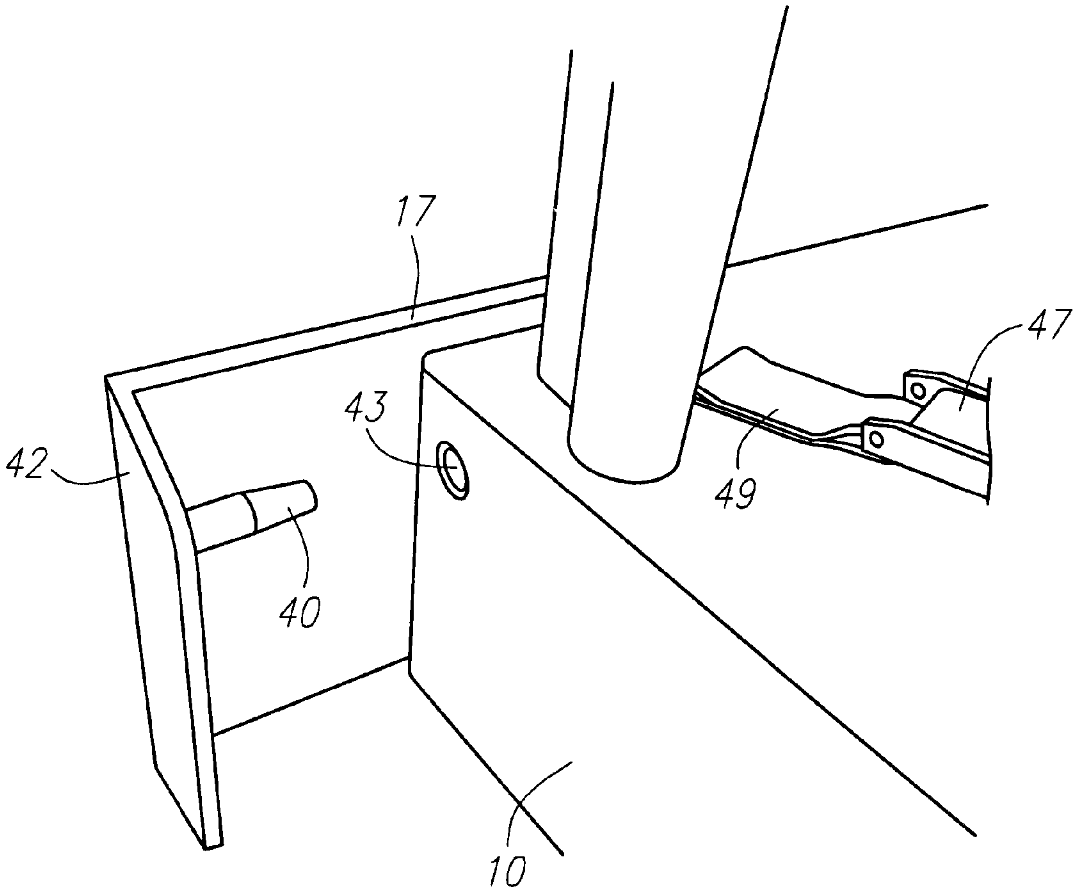
FIG. 9 is a close-up view of the wall with the lift stop and alignment pin.

The steps for operating the wheelchair transfer device 8 are as follows:

With the lifting device 12 in the raised position, the transfer platform 10 is pushed up against the wall 17 such that the transfer platform 10 is about two-thirds on the raised lifting device 12 and about one-third on the loading/unloading platform 4. In this manner, the two alignment rollers 16 closest to the wall 17 aid in aligning the transfer platform 10 on the lifting device 12. The transfer platform 10 is then pushed along the direction of the wall 17 until the alignment pin 40 attached to a lift stop 42 engages a mating recess 43 in the transfer platform 10. FIG. 9 illustrates a close-up view of the transfer platform 10 adjacent to the lift stop 42 and alignment pin 40. It should be appreciated that other alignment devices other than the alignment pin 40 can be used to align the transfer platform 10 on the lifting device 12. For example, a channel arrangement, a tongue-and-groove structure or the like can also be used.

Once the transfer platform 10 is pushed into position, an operator depresses the foot pedals 22 which extend the locking pins 18 into the locking pin sockets 20.

With the transfer platform 10 affixed to the lifting device 12, the operator lowers the lifting device 12 via control panel 30 or remote control device (not shown). The transfer platform 10 is lowered until the upper surface of the transfer platform 10 is substantially flush with the surface of the loading/unloading platform 4. Preferably, as seen in FIGS. 6(*a*) and 6(*b*), the lifting device 12 employs four adjustable bolts 45 that act as a hard stop (two of the adjustable bolts 45 are obstructed from view). The bolts 45 are advantageously located on the four corners of the lower frame of the lifting device 12.

Next, The wheelchair-using passenger 3 is then rolled, via the wheelchair, onto the transfer platform 10. The wheelchair is then secured to the transfer platform 10 by means of standard tie downs such as straps 45, buckles 47, clamps, or the like, as shown in FIG. 7.

The lifting device 12, transfer platform 10, and wheelchair-using passenger 3 are then raised by the operator via control panel 30 or remote control device (not shown). The lifting device 12 raises the transfer platform 10 until lower-most portion of the wheels 14 of the transfer platform 10 are substantially flush with the surface of the loading/unloading platform 4. Preferably, the lifting device 12 is a pneumatic scissors lift as shown in FIGS. 4, 5, 6(*a*), and 6(*b*). Of course, other types of lifting devices 12 can also be used. The upward movement of the lifting device 12 is stopped when the lifting device 12 physically abuts the facility iron angle 57, which is shown in FIGS. 6(*a*) and 6(*b*). The lifting device 12 may also include an optional secondary, or redundant lift stop that limits the extension or lift of the lifting device 12.

As seen in FIGS. 4 and 5, the lifting device 12 can include optional proximity sensors 44, 46. The proximity sensors 44, 46 aid in monitoring the position of the lifting device 12. The proximity sensors 44, 46 are preferably coupled to the control system for the lifting device 12 to assist in the control logic for the lifting device 12. The proximity sensors 44, 46 are particularly helpful when pneumatic air springs are used to move the lifting device 12.

Next, the operator raises the foot pedals 22 on the transfer platform 10 to disengage the two locking pins 18 from the locking pin sockets 20. Once disengaged from the locking pin sockets 20, the transfer platform 10 is rolled over to the ride vehicle 6 where it is placed adjacent to the passenger opening in the ride vehicle 6. It should be noted that the wheel chair passenger 3 is securely fastened to the transfer platform 10 at this point. The transfer platform 10 is oriented to keep the wheelchair-using passenger 3 facing the desired direction, i.e., forward facing.

Figure 8:
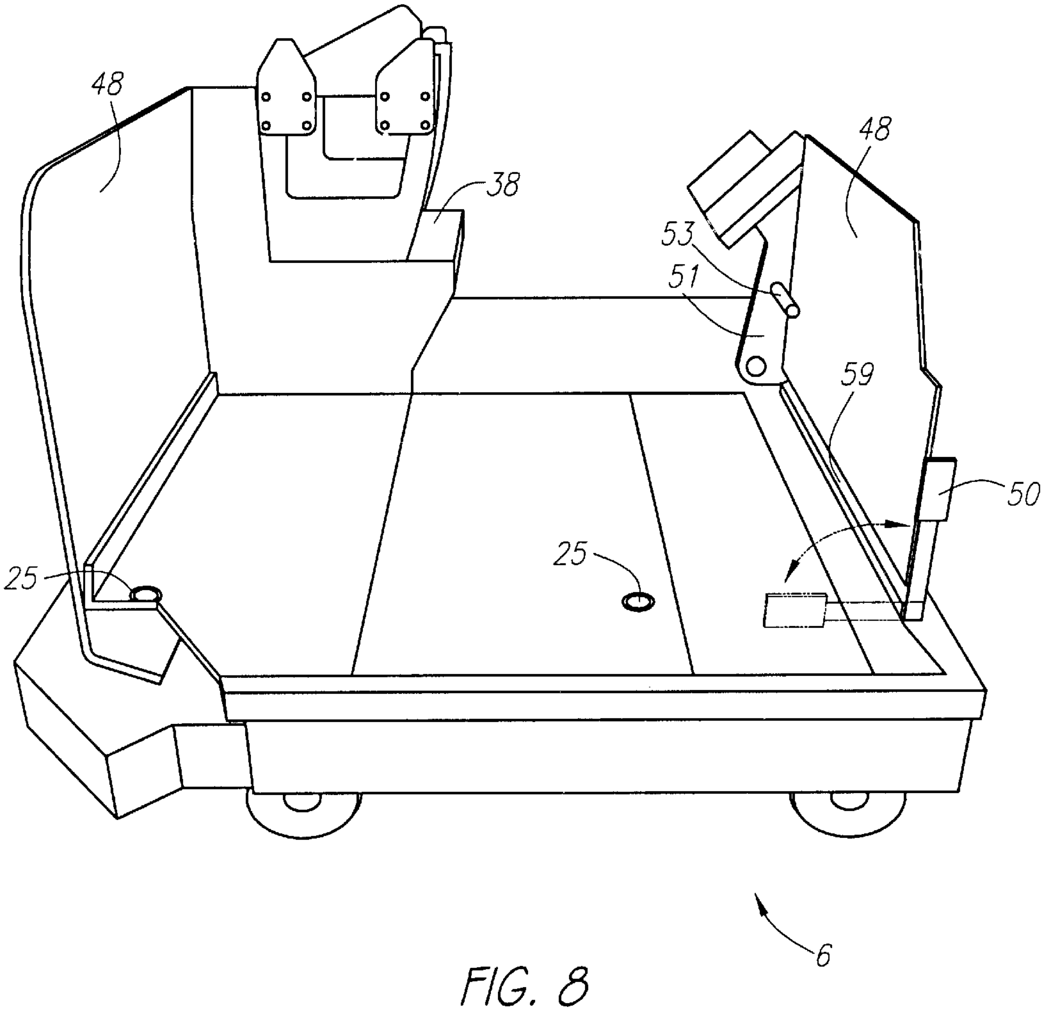
FIG. 8 is a side perspective view of the ride vehicle without the transfer platform inside.

Referring now to FIG. 8, the transfer platform 10 is then pushed onto the ride vehicle 6 by the operator(s). The alignment rollers 16 engage into a channel 59 located at the front side of the vehicle and with the rear wall 48 of the ride vehicle 6 to aid in guiding the transfer platform 10. The ride vehicle 6 preferably includes a lift stop 51 and alignment pin 53. A mating recess 43 in the transfer platform 10 engages with the alignment pin 53. Once in position, the operator presses down on the foot pedals 22 to engage the locking pins 18 in the locking pin sockets 25 located in the ride vehicle. Preferably, a visual flag 28 indicates to the operator that the locking pins 18 are properly engaged.

A safety lock 50 is then rotated 90°, either clockwise or counter-clockwise, depending on the orientation of the safety lock 50 from a vertical to a horizontal position by the operator. The safety lock 50 ensures that the transfer platform 10 is secured with a redundant fail-safe device. If any doors are located on the ride vehicle 6, the doors are shut by the operator or passenger. In conjunction with, or alternatively, an optional land-based and/or vehicle-based control monitor utilizing proximity sensors may be incorporated. Either system can be incorporated into the respective land or vehicle-based control system.

After loading is complete, the ride vehicle 6 departs from the loading/unloading platform 4 and travels along the track 5, as shown for example FIG. 1. When the ride is over, the ride vehicle 6 comes to rest adjacent to the loading/unloading platform 4. The operator then moves the safety lock 50 back to its vertical position. The foot pedals 22 are raised to disengage the locking pin sockets 20. The transfer platform 10 is then rolled out of the ride vehicle 6 by the operator.

The transfer platform 10 is then rolled over to the lifting device 12 area. At this point the lifting device 12 is in the raised position, i.e., as shown in FIGS. 2, 3, 4, and 6(*a*). The transfer platform 10, including the wheelchair-using passenger 3 thereon, is pushed against the wall 17 such that the transfer platform 10 is about two-thirds on the raised lifting device 12 and one-third on the loading/unloading platform 4. The transfer platform 10 is then pushed along the direction of the wall 17 until the alignment pin 40 attached to a lift stop 42 engages the mating recess 43 in the transfer platform 10.

Next, an operator depresses the foot pedal 22 which extends the locking pins 19 into the locking pin sockets 20. Once the transfer platform 10 is affixed to the lifting device 12, the operator lowers the lifting device 12 via control panel 30 or remote control device (not shown). The transfer platform 10 is lowered until the upper surface of the transfer platform 10 is substantially flush with the surface of the loading/unloading platform 4. The transfer platform 10 is in the position shown in FIG. 8.

At this point, the wheelchair-using passenger 3 is unsecured from the transfer platform 10. A restraining bar 55, as shown in FIG. 7, is lifted or otherwise moved and the wheelchair-using passenger 3 is then free to exit the ride 2 via the unloading/unloading platform 4. Since the transfer platform 10 is in the lowered position, a next wheelchair-using passenger 3 can then be secured to the vacant transfer platform 10.

It should be appreciated that multiple wheelchair transfer devices 8 can be employed for each ride 2. In this regard, the wheelchair-using passengers 3 can be loaded while the ride 2 is operating. The wheelchair-using passengers 3 could wait in a staging area or the like. Preferably, the wheelchair-using passengers 3 are secured on the transfer platforms 10 ahead of time. In this regard, the wheelchair-using passengers 3 can be quickly loaded into the ride vehicles 6. This significantly increases the passenger throughput of the ride 2 since time is not wasted during the loading or unloading of wheelchair-using passenger 3.

While embodiments of the present invention have been shown and described, various modifications may be made without departing from the scope of the present invention. The invention, therefore, should not be limited, except to the following claims, and their equivalents.

What is claimed is:

1. A wheelchair transfer device for use with an amusement ride comprising:

a passenger platform;

a ride vehicle;

a lifting device located beneath the passenger platform; and a moveable transfer platform, the moveable transfer platform being moveable between the ride vehicle, the passenger platform, and the lifting device.

2. A wheelchair transfer device according to claim 1, the lifting device comprising a lift stop and alignment pin projecting from the lift stop, wherein the moveable transfer platform is detachably engaged to the lifting device via the alignment pin.

3. A wheelchair transfer device according to claim 1 wherein the moveable transfer platform is detachably mounted to the lifting device via at least one locking pin.

4. A wheelchair transfer device according to claim 1, the moveable transfer platform further comprising a plurality of wheels.

5. A wheelchair transfer device according to claim 1, the moveable transfer platform further comprising two releasable locking pins.

6. A wheelchair transfer device according to claim 5 further comprising a release pedal for releasing the two locking pins.

7. A wheelchair transfer device according to claim 1 further comprising a lap bar on the moveable transfer platform.

8. A wheelchair transfer device according to claim 1 the lifting device moveable between a raised position and a lowered position.

9. A wheelchair transfer device according to claim 1, the moveable transfer platform being detachably mounted to the ride vehicle via at least one locking pin on the transfer platform.

10. A wheelchair transfer device according to claim 1, the moveable transfer platform further comprising alignment rollers.

11. A wheelchair transfer device according to claim 9, the ride vehicle including locking pin sockets for each locking pin of the moveable transfer platform.

12. A wheelchair transfer device according to claim 8, wherein when the moveable transfer platform is on the lifting device in the lowered position, an upper surface of the moveable transfer platform is substantially flush with the passenger platform.

13. A wheelchair transfer device according to claim 4, the lifting device moveable between raised positions and lowered positions, wherein when the moveable transfer platform is on the lifting device in the raised positions, the lowermost portion of the plurality of wheels is substantially flush with the passenger platform.

14. A wheelchair transfer device according to claim 1 further comprising a grab handle on the moveable transfer platform.

15. A wheelchair transfer device according to claim 1, the ride vehicle further comprising a safety lock.

16. A wheelchair transfer device according to claim 1, further comprising a wheelchair secured atop the moveable transfer platform.

17. A wheelchair transfer device according to claim 1 further comprising a visual flag indicating when the moveable transfer platform is mounted to the lifting device.

18. A method of loading wheelchair-using passengers into a ride vehicle comprising the steps of:

lowering a moveable transfer platform to a lowered position such that a top surface of the moveable transfer platform is substantially flush with the passenger platform;

securing a wheelchair-using passenger on the lowered moveable transfer platform;

raising the moveable transfer platform inside the passenger platform to a raised position;

moving the moveable transfer platform and wheelchair-using passenger to a ride vehicle; and securing the moveable transfer platform and wheelchair-using passenger to the ride vehicle.

19. A wheelchair transfer device for use with an amusement ride comprising:

a passenger platform;

a ride vehicle located adjacent to the passenger platform;

a lifting device located beneath the passenger platform, the lifting device including an upper platform surface thereon, the lifting device moveable between a lowered position and a raised position, wherein in the raised position the upper platform surface of the lifting device is substantially flush with the passenger platform; and a transfer platform having a plurality of wheels, the transfer platform being moveable between the ride vehicle, the passenger platform, and the lifting device.

* * * * *